(12) United States Patent
Hutchinson (10) Patent No.: US 7,036,451 B1
(45) Date of Patent: May 2, 2006

(54) APPARATUS FOR MOUNTING UNDERWATER MARINE DETECTION EQUIPMENT ON A WATERBORNE VESSEL

(76) Inventor: Len K. Hutchinson, 2512 Mosswood Dr., Florence, SC (US) 29501

( * ) Notice: Subject to any disclaimer, the term of this patent is extended or adjusted under 35 U.S.C. 154(b) by 0 days.

(21) Appl. No.: 11/195,555

(22) Filed: Aug. 3, 2005

(51) Int. Cl.
*B63B 17/00* (2006.01)

(52) U.S. Cl. .................. 114/364; 248/231.71; 440/6

(58) Field of Classification Search ............... 114/364; 248/231.71; 440/6
See application file for complete search history.

(56) References Cited

U.S. PATENT DOCUMENTS

| | | | | |
|---|---|---|---|---|
| 3,580,212 A | * | 5/1971 | Fortson | 440/6 |
| 3,989,216 A | * | 11/1976 | Veatch | 248/278.1 |
| 5,131,875 A | * | 7/1992 | Lee | 440/7 |

* cited by examiner

Primary Examiner—Jesus D. Sotelo (57) ABSTRACT

An apparatus for mounting underwater marine detection equipment on a waterborne vessel is provided having a baseplate which is secured to a side of the waterborne vessel. The baseplate extends outward from the side of the waterborne vessel over the surface of the water. A shaft holder bracket is rotatably mounted to the baseplate such that the shaft holder bracket may rotate in a plane generally parallel to the forward and reverse direction of the waterborne vessel from a first position to a second position. The shaft holder bracket has a through passageway to receive a shaft. An elongate shaft having an upper portion and a lower portion which are rotatably joined and separable, is slidably engaged through the passageway in the shaft holder bracket, such that the elongate shaft can rotate and slide within the shaft holder bracket. The shaft holder bracket has means to secure the elongate shaft from rotation and sliding. The elongate shaft has a handle on the top of the shaft and a marine detection equipment mount on the bottom of the shaft. The elongate shaft is long enough to extend below the bottom surface of the waterborne vessel when the shaft holder bracket is in the first position, and the elongate shaft is totally out of the water when the shaft holder bracket is rotated to the second position. The marine detection equipment mount is rotatably and adjustably attached to the lower portion of the elongate shaft, such that the marine detection equipment mount can rotate 360 degrees in a plane perpendicular to the surface of the water. The marine detection equipment mount has means to secure marine detection equipment.

16 Claims, 4 Drawing Sheets

Fig. 1

APPARATUS FOR MOUNTING UNDERWATER MARINE DETECTION EQUIPMENT ON A WATERBORNE VESSEL

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER LISTING COMPACT DISK APPENDIX

Not Applicable

BACKGROUND OF THE INVENTION

This invention relates to an apparatus for mounting underwater marine detection equipment on a waterborne vessel, and more particularly for boats as a mounting apparatus for a fishfinder sonar transducer for use in determining depth, assist in navigation, locating fish and scanning for underwater structures, and for mounting a portable underwater camera for viewing fish or structures.

Various types of mounting brackets and apparatus are known in the prior art. For example, U.S. Pat. No. 6,065,420, incorporated herein by reference, issued on May 23, 2000 is concerned with a portable transducer mount with no means provided for mounting to a boat or vessel deck railing or for mounting to the side walls of an aluminum boat or the like, limited vertical and horizontal scanning adjustment, and no means for mounting an underwater viewing camera.

U.S. Pat. No. 5,529,272, incorporated herein by reference, issued on Jun. 25, 1996, is concerned with a transducer mount with no means for mounting to a boat or vessel deck, limited vertical adjustment for scanning, no means for mounting an underwater viewing camera, and no means for protecting the transducer or camera from damage as the result of contact with an underwater object or structure.

U.S. Pat. No. 5,016,225, incorporated herein by reference, issued on May 14, 1991 is concerned with a transducer mount with no vertical adjustment capabilities, no means for mounting an underwater viewing camera, no secure mounting capabilities for deck railing or deck mounting, and no means for protecting the mount from damage upon striking an underwater object or structure.

U.S. Pat. No. 4,928,915, incorporated herein by reference, issued on May 29, 1990 is concerned with a transducer mount with limited vertical adjustment capabilities, no means for mounting an underwater viewing camera, no means for mounting to a boat or vessel deck railing or side walls of an aluminum boat or the like, and no means for protecting the mount from damage upon striking an underwater object or structure.

U.S. Pat. No. 4,811,310, incorporated herein by reference, issued on Mar. 17, 1989, is concerned with a transducer mount designed to be stationary on a boat transom only, with no horizontal adjustment and limited vertical adjustment for scanning, and no means for mounting an underwater viewing camera.

U.S. Pat. No. 4,285,485, incorporated herein by reference, issued on Aug. 25, 1981, is concerned with a transducer mount with limited vertical adjusting capabilities, no means for mounting an underwater viewing camera, no secure means for mounting onto a boat or vessel deck railing, and it is not designed for a deck mounting.

U.S. Pat. No. 4,282,590, incorporated herein by reference, issued on Aug. 4, 1981, is concerned with a transducer mount with limited vertical adjusting capabilities, no means for mounting to a boat deck railing or deck, no means of mounting an underwater viewing camera, no means for protecting the mount from damage upon striking an underwater object or structure, and the invention has an excessive number of components that make it more costly to manufacture.

U.S. Pat. No. 4,152,690, incorporated herein by reference, issued on May 1, 1979, is concerned with a transducer mount designed for mounting only onto a trolling motor, with no means of mounting an underwater viewing camera, and having limited vertical adjusting capabilities.

U.S. Pat. No. 3,989,216, incorporated herein by reference, issued on Nov. 2, 1976, is concerned with a transducer mount with limited vertical adjustment capabilities, no means for mounting an underwater viewing camera, no means for mounting to a boat deck railing or side walls of an aluminum boat or the like, and is designed with an excessive number of components, being more costly to manufacturer.

U.S. Pat. No. 3,752,431 issued Aug. 14, 1973, U.S. Pat. No. 3,729,162 issued Apr. 24, 1973, and U.S. Pat. No. 3,714,619 issued Jan. 30, 1973, are incorporated herein by reference, and are all concerned with transducer mounts designed for mounting on a boat or vessel transom only, having no means for mounting to a boat or vessel deck, railing, or side walls of an aluminum boat or the like. All three of these patents have no horizontal adjusting capabilities, limited vertical adjusting capabilities, and no means for mounting an underwater viewing camera.

U.S. Pat. No. 3,740,706, incorporated herein by reference, issued on Jun. 19, 1973, is concerned with a transducer mount with limited vertical adjusting capabilities, no means for mounting onto a boat deck railing, mounting to the side walls of an aluminum boat or the like, and no means for mounting an underwater viewing camera.

While the prior art are all directed to transducer mounting brackets and apparatus, none combine all the features in prior art nor additional features not taught in the prior art which are desirable to fulfill all the needs of the typical fisherman or boater. The object of the present invention is to combine all of the desired features in prior art, while providing improved and additional features, such as a limited number of components that are lightweight and corrosion resistant, the means to be able to attach the present invention to the side walls of aluminum vessels and vessel deck rails, as well as vessel decks, the means to be able to scan in unlimited vertical and horizontal directions, and the means to be able to attach underwater viewing cameras as well as marine transducers, thus fulfilling all of the needs of the typical fisherman or boater.

BRIEF SUMMARY OF THE INVENTION

According to the present invention an apparatus for mounting underwater marine detection equipment on a waterborne vessel is provided comprising: a baseplate which has means to be secured to a side of the waterborne vessel. The baseplate extends outward from the side of the waterborne vessel over the surface of the water. A shaft holder bracket is rotatably mounted to the baseplate, such that the shaft holder bracket may rotate in a plane generally parallel to the forward and reverse direction of the waterborne vessel from a first position to a second position. The shaft holder bracket has a through passageway to receive a shaft, such that when the shaft holder bracket is in the first position, the shaft extends into the water vertically. When the shaft holder bracket is in the second position, the shaft would totally out of the water. An elongate shaft is slidably engaged through the passageway in the shaft holder bracket, such that the elongate shaft can rotate and slide within the shaft holder bracket. The shaft holder bracket has means to secure the elongate shaft from rotation and sliding, preferably by a set screw. The elongate shaft has an upper portion and a lower portion, the upper and lower portions being rotatably joined and separable, preferably rotatably joined by threaded coupling means, for example one portion having male threads and the other portion having female threads. A resilient washer preferably surrounds the threaded coupling means, so that the resilient washer allows adjustable tightening of the threaded coupling means. The elongate shaft has an end above the shaft holder bracket, having a handle. The elongate shaft is long enough to extend below the bottom surface of the waterborne vessel when the shaft holder bracket is in the first position and is totally out of the water when the shaft holder bracket is rotated to the second position. A collar surrounds the elongate shaft adjacent and above the shaft holder bracket. The collar is such that the elongate shaft can rotate and slide within the collar. The collar has means to secure the elongate shaft from rotation and sliding, preferably by a set screw. A first shaft catch is mounted to the baseplate and aligned below the rotatable shaft holder bracket when the shaft holder bracket is in the first position. The first shaft catch has an opening to receive and frictionally hold the elongate shaft, such that the elongate shaft may be frictionally held when the shaft holder bracket engaging the elongate shaft is rotated to the first position, and whereby the elongate shaft may be released from the first shaft catch if a force strikes the elongate shaft below the surface of the water. A second shaft catch is mounted to the baseplate on the forward side of the baseplate and aligned with the passageway of the shaft holder bracket when the shaft holder bracket is in the second position. The second shaft catch has an opening to receive and to frictionally hold the elongate shaft when the shaft holder bracket engaging the elongate shaft is rotated to the second position. A marine detection equipment mount is rotatably and adjustably attached to the lower portion of the elongate shaft such that the marine detection equipment mount can rotate 360 degrees in a plane perpendicular to the surface of the water. The marine detection equipment mount has means, such as straps, to secure the marine detection equipment.

Preferably, the lower portion of the elongate shaft has a lower end extending from the lower portion of the shaft at a angle of about 90 degrees. The marine detection equipment mount is rotatably attached and adjustable to the lower end.

According to the present invention, it is preferable that the baseplate is reversible; that the baseplate can be mounted on a side of the waterborne vessel. Depending on the type of waterborne vessel, the baseplate can be mounted on the waterborne vessel for example, with one or more screws or bolts, by means of a C-clamp attached to the baseplate, or by means of a rail clamp attached to the baseplate.

In order to better appreciate and understand the present inventions contribution to the art, and for a better understanding of the invention, its operating advantages and the specific objects attained by its uses, reference should be made to the accompanying drawings and descriptive matter in which there are illustrated preferred embodiments of the invention. There are, of course, additional features of the invention that will be described hereinafter and which will form the subject matter of the claims appended hereto.

It is understood that the invention is not limited in its application to the details of construction and to the arrangement of the components set forth in the following description or illustrated in the drawings. The invention is capable of other embodiments and of being practiced and carried out in various ways. It is understood that even though the drawings show the members as individual parts, they may be produced as combination member parts. While the member elements are preferably of composite plastics, reinforced plastics or fiberglass, they made be made of metals such as aluminum, for example. Also, it is to be understood that the phraseology and terminology employed herein are for the purpose of description and should not be regarded as limiting. In the present description it will be appreciated that the front of waterborne vessels may be alternately called the forward side or bow, and the rear may be called the aft. As such, those skilled in the art will appreciate that the conception, upon which this disclosure is based, may readily be utilized as a basis for various modifications, and the designing of other structures, methods and systems for carrying out the several purposes of the present invention. It is important, therefore, that the claims be regarded as including such equivalent modifications and construction insofar as they do not depart from the spirit and scope of the present invention.

BRIEF DESCRIPTION OF THE DRAWINGS

The invention will be better understood by reference to the accompanying drawings, wherein.

DETAILED DESCRIPTION OF THE INVENTION

The present invention is set apart from prior art by providing improved and unlimited horizontal and vertical scanning capabilities, lightweight and corrosion resistant components, a broader selection of mounting capabilities, and the means to attach other underwater scanning devices such as viewing cameras in addition to marine transducers. The present invention will be described in conjunction with accompanying Figures. It is to be understood that the detailed description shows the preferred embodiments, but one skilled in the art may understand that other means and materials may be used to practice the invention as disclosed and claimed. More details of the preferred embodiments, without limiting the scope of the present invention are given herein below.

Figure 1:
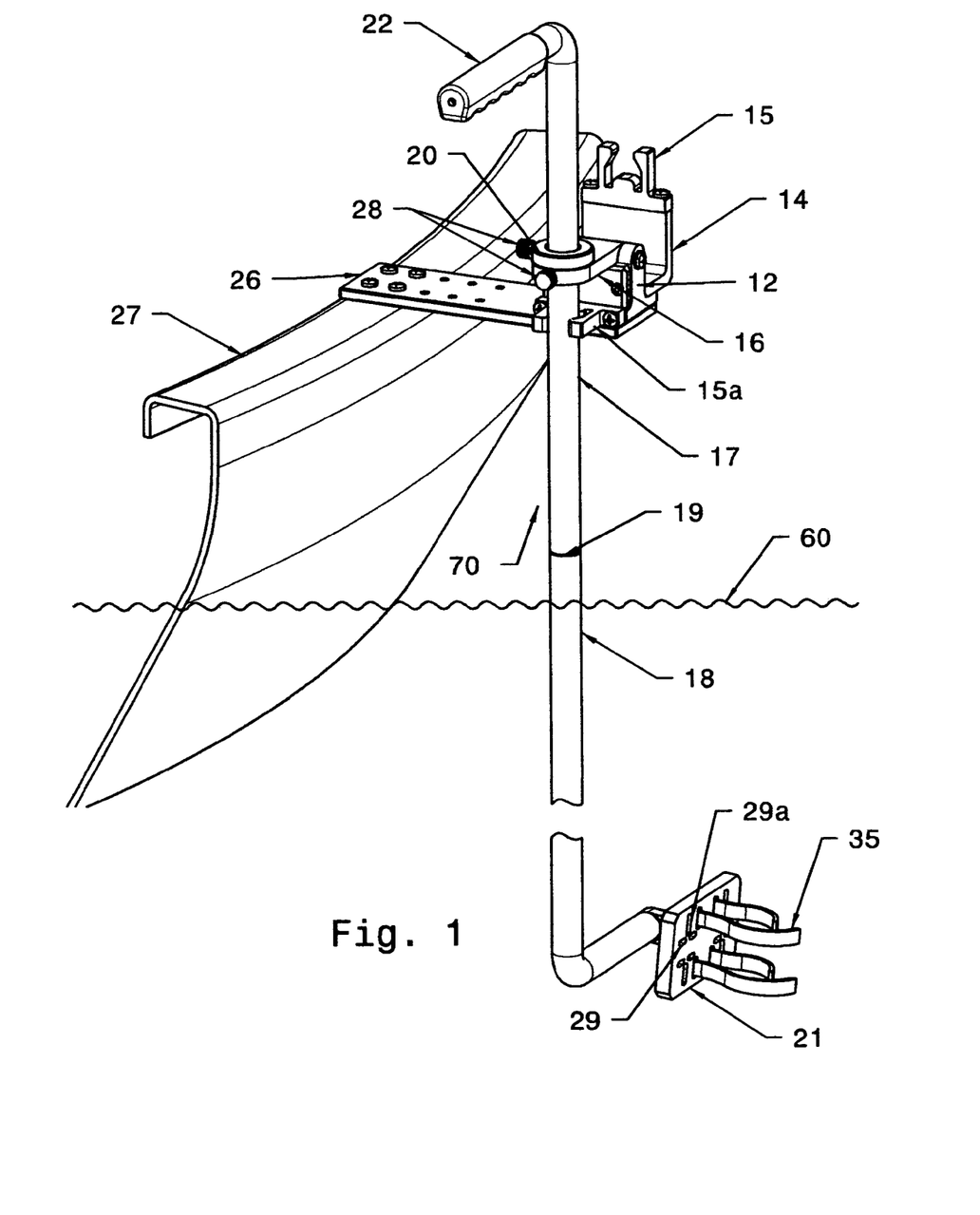
FIG. 1 is a perspective view of a typical apparatus for mounting underwater marine detection equipment on a waterborne vessel of this invention, mounted in a functional configuration on the bow of a boat, with the main shaft lowered into the water in a functional vertical position, allowing the transducer or camera mounting plate assembly to be submerged in the desired position.

Referring now to FIG. 1, according to the present invention an apparatus for mounting underwater marine detection equipment on a waterborne vessel 27 is provided in a preferred embodiment as having: a baseplate 26 which has means to be secured to either side of the waterborne vessel 27. The baseplate 26 extends outward from the side of the waterborne vessel 27 over the surface of the water 60. A shaft holder bracket 16 is rotatably mounted to the main bracket 12, such that the shaft holder bracket 16 may rotate in a plane parallel to the forward and reverse direction of the waterborne vessel 27 from a first position to a second position. The shaft holder bracket 16 has a through passageway to receive a shaft 70, such that when the shaft holder bracket 16 is in the first position, the shaft 70 extends into the water 60 vertically. When the shaft holder bracket 16 is in the second position, the shaft 70 would be totally out of the water. An elongate shaft 70 is slidably engaged through the passageway in the shaft holder bracket 16, such that the elongate shaft 70 can rotate and slide within the shaft holder bracket 16. The shaft holder bracket 16 has means to secure the elongate shaft 70 from rotation and sliding, preferably by a set screw 28. The elongate shaft 70 has an upper portion 17 and a lower portion 18, the upper and lower portions being rotatably joined and separable, preferably rotatably joined by threaded coupling means, referring now to FIG. 5 for example, one portion 17a having male threads and the other portion 18a having female threads. A resilient washer 19 preferably surrounds the threaded coupling means, so that the resilient washer 19 allows adjustable tightening of the threaded coupling means. The elongate shaft 70 has an end above the shaft holder bracket 16, having a handle 22. Now referring to FIG. 1, the elongate shaft 70 is long enough to extend below the bottom surface of the waterborne vessel 27 when the shaft holder bracket 16 is in the first position and is totally out of the water 60 when the shaft holder bracket 16 is rotated to the second position. A collar 20 surrounds the elongate shaft 70 adjacent and above the shaft holder bracket 16. The collar 20 is such that the elongate shaft 70 can rotate and slide within the collar 20. The collar 20 has means to secure the elongate shaft 70 from rotation and sliding, preferably by a set screw 28. A first shaft catch 15a is mounted to the main bracket 12 and aligned below the rotatable shaft holder bracket 16 when the shaft holder bracket 16 is in the first position. The first shaft catch 15a has opening to receive and to frictionally hold the elongate shaft 70, such that the elongate shaft 70 may be frictionally held when the shaft holder bracket 16 engaging the elongate shaft 70 is rotated to the first position, and whereby the elongate shaft 70 may be released from the first shaft catch 15a if a force strikes the elongate shaft 70 below the surface of the water. A second shaft catch 15 is mounted to the shaft catch bracket 14 that is attached on the forward side of the baseplate 26 and aligned with the passageway of the shaft holder bracket 16 when the shaft holder bracket 16 is in the second position. The second shaft catch 15 has an opening to receive and to frictionally hold the elongate shaft 70 when the shaft holder bracket 16 engaging the elongate shaft 70 is rotated to the second position. A marine detection equipment mount 21 is rotatably and adjustably attached to the lower portion 18 of the elongate shaft 70 such that the marine detection equipment mount 21 can rotate 360 degrees in a plane perpendicular to the surface of the water 60. The marine detection equipment mount 21 has means, such as straps 35, to secure the marine detection equipment 52, as shown in FIG. 8.

Figures 5, 6, 7, 8:
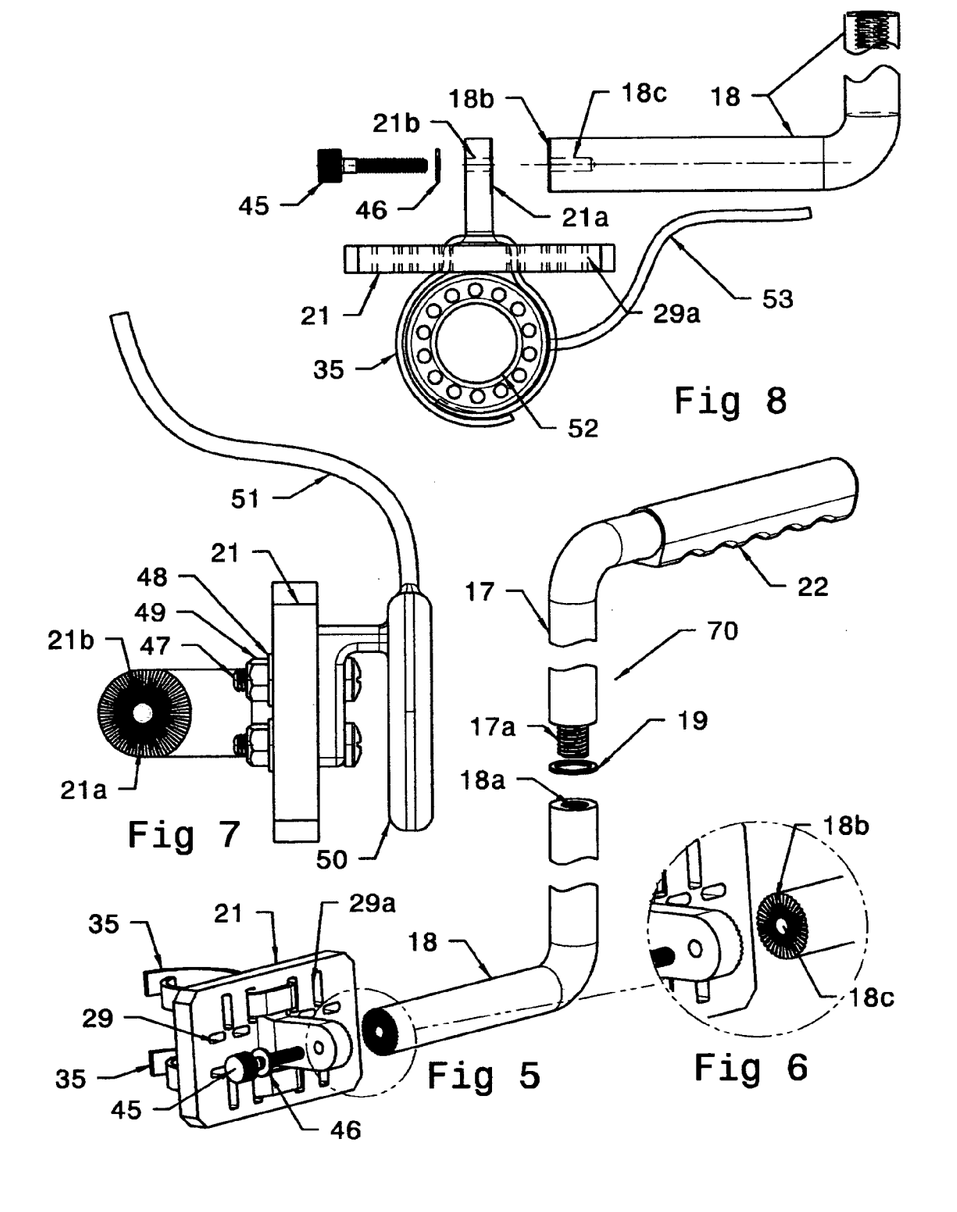
FIG. 5 is a perspective view of the upper and lower members of the main shaft of the present invention, and the transducer or underwater camera mounting plate assembly.
FIG. 6 is an exploded, perspective view of the ribbed connection points on the lower shaft and transducer or camera mounting plate of FIG. 5.
FIG. 7 is a side view showing a typical transducer mounted on the transducer or camera mounting plate of the present invention.
FIG. 8 is a front view of a typical underwater camera strapped to the transducer or camera mounting plate of the present invention, and how the transducer or camera mounting plate is attached to the lower shaft.

Preferably, the lower portion 18 of the elongate shaft 70 has a lower end, as shown in FIG. 6, which extends from the lower portion 18 of the shaft 70 at an angle of about 90 degrees. The marine detection equipment mount 21 is rotatably attached and adjustable to the lower end, as shown in FIG. 6.

Figures 9, 10:
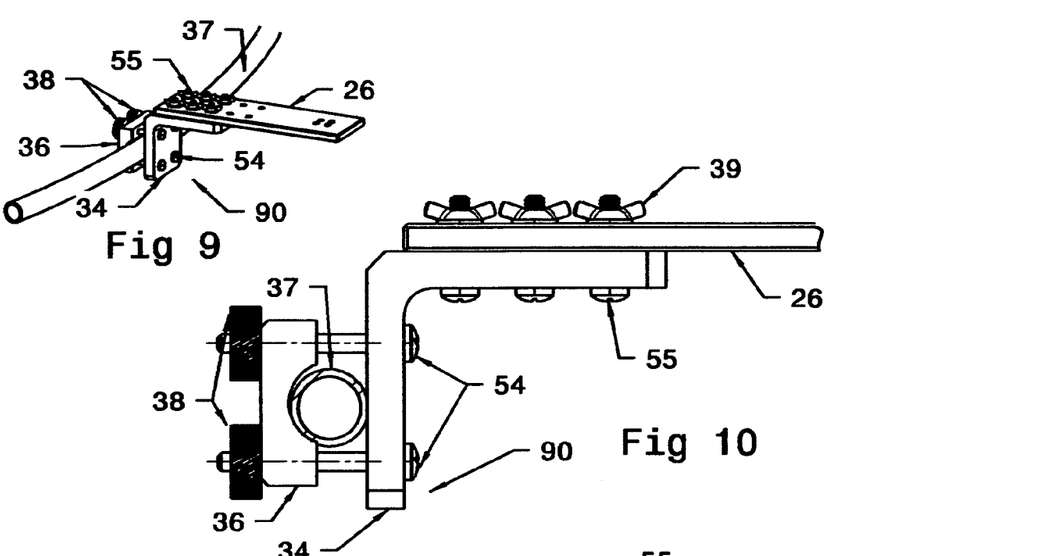
FIG. 9 is a perspective view of the rail clamp attachment of the present invention that allows the apparatus shown in FIG. 1 to be mounted as a portable unit to a boat or vessel that has a railing.
FIG. 10 is a side view of the portable rail clamp attachment of FIG. 9, as it appears attached to a boat deck rail, and attached to the base plate.

According to the present invention, it is preferable that the baseplate 26 is reversible; that the baseplate 26 can be mounted on a side of the waterborne vessel. Depending on the type of waterborne vessel 27, the baseplate 26 can be mounted on the waterborne vessel 27, for example, with one or more fasteners 40, by means of a C-clamp 80, as shown in FIG. 11, attached to the baseplate 26, or by means of a rail clamp 90, as shown in FIG. 9, attached to the baseplate 26.

Figures 2, 3, 4:
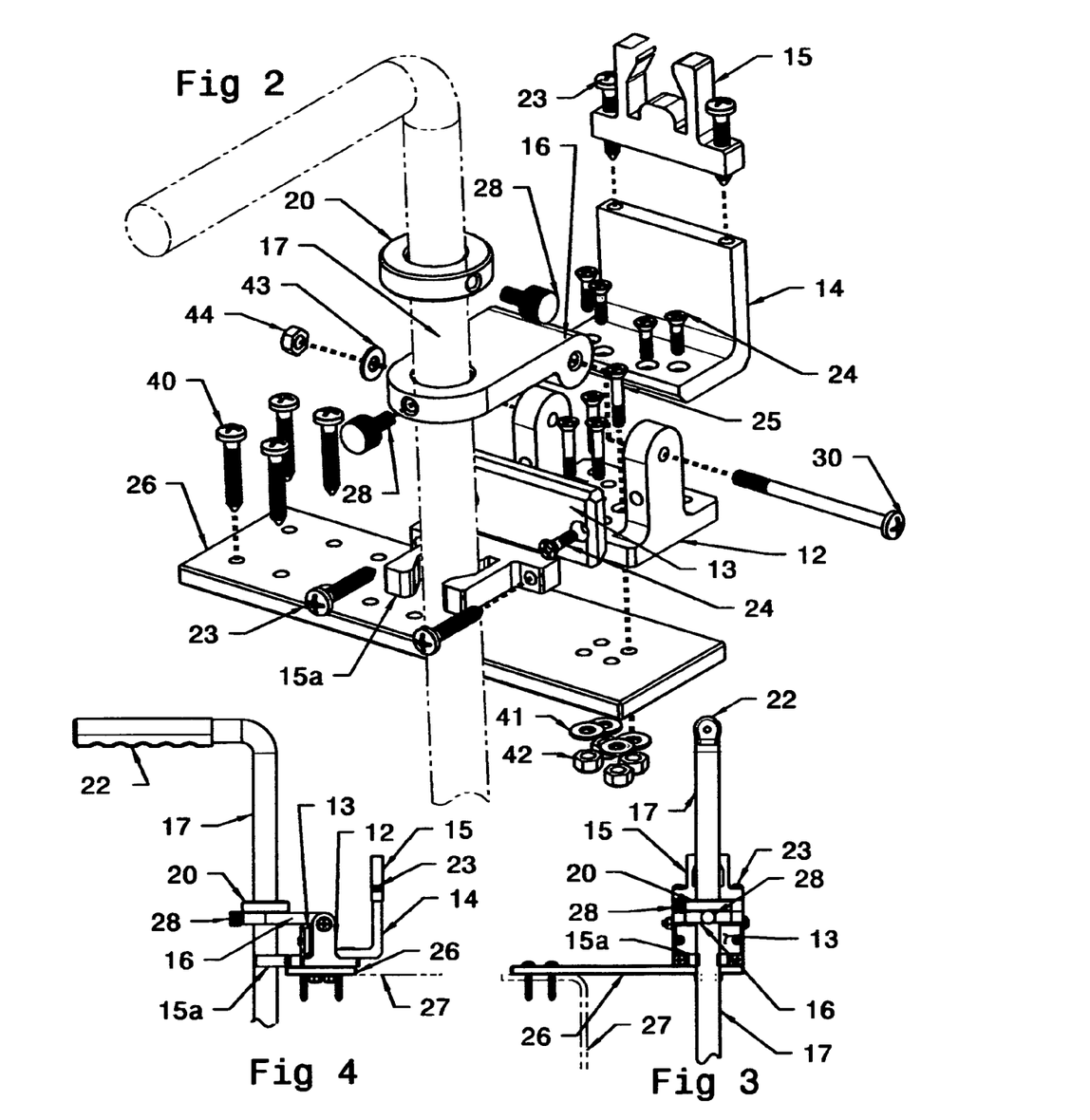
FIG. 2 is an enlarged, perspective view of the portion of the apparatus shown in FIG. 1 that remains out of the water.
FIG. 3 is a front view of the apparatus shown in FIG. 2.
FIG. 4 is a side view of the apparatus shown in FIG. 2.

More details of the preferred embodiments, without limiting the scope of the present invention are given herein below:

Referring now to FIG. 1, a preferred embodiment this invention is generally Illustrated as a two part elongated shaft 70, the upper shaft 17 being joined to the lower shaft 18. The length of both upper shaft 17 and lower shaft 18 may be manufactured as different lengths. See FIG. 5 that shows the exposed threads 17a and the internal threaded aperture 18a, as well as the rubber washer 19 for joining the two shaft members. The rubber washer 19 allows the upper shaft 17 to be joined to lower shaft 18 so that the handle 22 can be aligned to point in the horizontal direction of the mounted transducer or camera. Referring again back to FIG. 1, the upper shaft 17 has a 90° turn at the top to facilitate having the pointing handle with the handle grip 22. The shaft is supported by shaft holder bracket 16 that is hinged to the main bracket 12. The shaft holder bracket 16 has an internal threaded aperture to facilitate the use of a bar knob 28, or the like, to selectively hold in place or change the horizontal direction of the shaft 70 about its axis, thus also adjusting the scanning direction of the transducer or camera. A depth adjusting collar 20, that has an internal threaded aperture to facilitate a bar knob 28 or the like, is positioned just above the shaft holder bracket 16 to allow depth adjustment of the shaft 70. Referring to FIG. 2, shaft holder bracket 16 has an aperture through the end that slips into main bracket 12, thus allowing the insertion of screw 30 through main plate 12 and shaft holder bracket 16, and securing with washer 43 and lock nut 44. The shaft holder bracket 16 can pivot 90° to allow the main shaft 70 to either be out of the water 60 horizontally for traveling or storage, or extended into the water 60 vertically for operational scanning. Referring to FIG. 1, the main plate 12 is attached to the reversible base plate 26, as shown in FIG. 1 for a right bow mount of a boat 27, reversed for mounting on the left side, or turned 90° so the shaft rests off the end of the reversible mount 26 when mounting on the rear or transom of a boat or vessel. The main plate 12 is attached to the reversible base plate 26 through apertures placed symmetrically allowing the attachment of main plate 12 for the bow, aft portion or rear of the vessel. The main plate 12 is attached with one or more fasteners 25, washers 41, and nuts 42. As an example, the reversible base plate 26 may be attached to a boat deck by installing one or more fasteners 40, or by using wing nut fasteners for easy removal, or by portable attachment as further explained below. As seen in detail in FIG. 2, stop plate 13 is attached to the main mount 12 through apertures in stop plate 13 by means of fasteners 24. When the shaft 70 is lowered into the water 60, the shaft holder bracket 16 rests on the stop plate 13, holding shaft 70 in a vertical position. Shaft catch holding bracket 14 is attached to the rear of the main bracket 12 with fasteners 24, easily referenced in FIG. 2. There are two shaft catch mechanisms 15 and 15a. The grab arms on shaft catches 15 and 15a are designed to slightly separate when coming in contact with shaft 70, allowing the shaft to enter under slight pressure. As the shaft 70 enters the shaft catch 15 or 15a, the arms of the shaft catch retract, holding the shaft 70 in position under friction. Shaft catch 15 is attached to the top of shaft catch holding bracket 14 with fasteners 23. When the shaft 70 is lifted out of the water 60, as in securing for travel or storage, the shaft 70 can be secured in a safe, horizontal position. The shaft catch 15a is attached to the lower front of the main plate 12 with fasteners 23. Shaft catch 15a is a secure catch to hold the shaft 70 in the vertical position while in use, and to disengage should the shaft 70 or the transducer/camera mounting plate 21 strike a submerged object while moving forward, thus resisting possible damage to the shaft 70, the mounting plate 21, the transducer 50 or camera 52. After striking an object, the shaft 70 is simply inserted back into the shaft catch 15a. This invention is designed for relatively slow speed operation by the boat due to inherent design of the invention, and design characteristics of most sonar receiver transducers. FIG. 3 is a front view of exploded view in FIG. 2, and FIG. 4 is a side view of exploded view in FIG. 2. Referring to FIG. 1, the portion of the apparatus that is below waterline 60 is the lower shaft 18 and the transducer/camera mounting plate 21. FIG. 5 shows more detail as explained hereunder: The lower shaft 18 has a 90° bend to allow the transducer/camera mounting plate 21 to be positioned for scanning anywhere in a 360° vertical circle, thus allowing unlimited vertical adjustment, with the shaft 70 allowing 360° unlimited horizontal adjustment for scanning. The angle of search may be to any angle desired, with the efficiency of the area scanned being dependent upon the design characteristics of the electronic equipment being used and the ability of the operator to properly read the signals displayed on the equipment readout screen, however success in locating fish and structure is greatly enhanced by the ability of being able to scan in unlimited horizontal and vertical directions into areas such as under boat docks, lily pad formations, and into fallen trees. The area FIG. 6 is an exploded view of 18b, the ribbed lower end of shaft 70, and threaded aperture 18c at the lower end of shaft 70. Washer 46 is placed on bar knob 45 shown in FIG. 5, then bar knob 45 is inserted through aperture 21b as shown in FIG. 7. The ribbed area 21a meets the ribbed area 18b to hold the transducer/camera mounting plate 21 in place at the desired scanning angle by tightening the bar knob 45. FIG. 5 shows a plurality of apertures formed through the transducer/camera mounting plate 21. Apertures 29 allow different types of transducer base configurations to be attached thereto. Apertures 29a allow the different size and configurations of underwater cameras to be attached with self-gripping straps 35. FIG. 7 shows a typical fishfinder sonar transducer 50 mounted to transducer/camera mounting plate 21 with fasteners 47, washers 48, and nuts 49. The transducer power cable 51 leads up into the boat or vessel to the marine sonar unit. It may be loosely attached to the shaft 70 by means of cable ties, or the like, if desired. FIG. 8 illustrates a typical underwater viewing camera 52 strapped to the transducer/camera mounting plate 21 with self-gripping straps 35. The camera power cable 53, that leads up to the display unit in the boat or vessel, may be loosely attached to the shaft 70, as seen in FIG. 5, with cable ties, or the like.

Figures 11, 12:
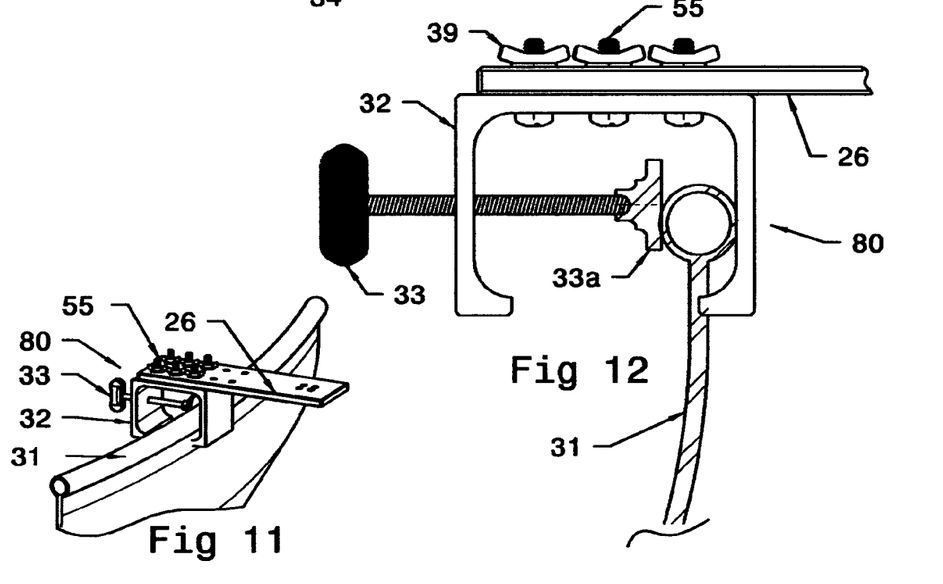
FIG. 11 is a perspective view of the C-clamp attachment of the present invention that allows the apparatus shown in FIG. 1 to be mounted as a portable unit to the sides or rear of a boat such as an aluminum or wood.
FIG. 12 is a side view of the portable C-clamp attachment of FIG. 11, as it appears attached to a boat and attached to the base plate.

FIG. 11 shows C-clamp 80 that may be attached to the reversible base plate 26, thus allowing the portable marine transducer or underwater camera mounting apparatus to be attached, for example, to a wood boat, to an aluminum boat 31, or the like. FIG. 12 a side view of C-clamp 80, with a bar knob screw 33 that has a pressure tightening plate 33a on the inside end of the screw 33, or the like, inserted for clamping, for example, to vessels, wood boats, aluminum boats 31, or the like. C-clamp 80 is designed to clamp onto round or square sides. A plurality of apertures are provided on the top that match up with the plurality of apertures on the reversible base plate 26. Fasteners 55 may be used to attach the C-clamp 80 to the reversible base plate 26, securing in place, for example, with wing nuts 39, or the like, for easy removal.

FIG. 9 shows the rail clamp 90 that may be attached to the reversible base plate 26, thus allowing the portable marine transducer or underwater camera mounting apparatus to be attached to a boat or vessel that has a deck railing 37, or the like. FIG. 10 is a side view of the rail clamp 90, which consists of part 34 that attaches to the reversible base plate 26, and part 36 that fits around the railing. The two parts are simply tightened together around the railing, providing a friction clamp that by selectively being loosened and tightened can be positioned anywhere on a railing. Fasteners 54 are inserted through apertures in part 34, extending beyond railing 37 and through apertures on part 36. Bar knob type screws 38 are provided for easy adjustment or removal. A plurality of apertures are provided in part 34 that match up with the plurality of apertures on the reversible base plate 26. Fasteners 55 are used to attach the rail clamp 90 to the reversible base plate 26, securing in place, for example, with wing nuts 39, or the like, for easy removal.

What is claimed is:

1. An apparatus for mounting underwater marine detection equipment on a waterborne vessel comprising:
   a baseplate having means to be secured to the side of the waterborne vessel, the baseplate extending outward from the side of the waterborne vessel, over the surface of the water;
   a shaft holder bracket rotatable mounted to the baseplate, such that the shaft holder bracket may rotate in a plane parallel to the forward and reverse direction of the waterborne vessel from a first position to a second position, the shaft holder bracket having a through passageway to receive a shaft;
   an elongate shaft having an upper portion and a lower portion, the upper and lower portions being rotatable joined and separable, the elongate shaft being slidably engaged through the passageway in the shaft holder bracket, such that the elongate shaft can rotate and slide within the shaft holder bracket, the shaft holder bracket having means to secure the elongate shaft from rotation and sliding, the elongate shaft having an end above the shaft holder bracket, the end above the shaft holder bracket having a handle; the elongate shaft being long enough to extend below the bottom surface of the waterborne vessel when the shaft holder bracket is in the first position, the elongate shaft being totally out of the water when the shaft holder bracket is rotated to the second position;

a marine detection equipment mount rotatably and adjustably attached to the lower portion of the elongate shaft, such that the marine detection equipment mount can rotate 360 degrees in a plane perpendicular to the surface of the water, the marine detection equipment mount having means to secure marine detection equipment;

a first shaft catch mounted to the baseplate and aligned below the rotatable shaft holder bracket when the shaft holder bracket is in the first position, the first shaft catch having an opening to receive and to frictionally hold the elongate shaft, such that the elongate shaft may be frictionally held when the shaft holder bracket engaging the elongate shaft is rotated to the first position, and whereby the elongate shaft may be released from the first shaft catch if a force strikes the elongate shaft below the surface of the water; and a second shaft catch mounted to the baseplate on the forward side of the baseplate and aligned with the passageway of the shaft holder bracket when the shaft holder bracket is in the second position, the second shaft catch having an opening to receive and frictionally hold the elongate shaft when the shaft holder bracket engaging the elongate shaft is rotated to the second position.

2. The apparatus of claim 1 further comprising:

a collar around the elongate shaft, adjacent and above the shaft holder bracket, the elongate shaft being able to rotate and slide within the collar, the collar having means to secure the elongate shaft from rotation and sliding.

3. The apparatus of claim 2 wherein the baseplate has means to be mounted on either side of the waterborne vessel.

4. The apparatus of claim 3 wherein the means for securing the baseplate to the side of the waterborne vessel comprises: at least one bolt securing the baseplate to the side of the waterborne vessel.

5. The apparatus of claim 3 wherein the means for securing the baseplate to the side of the waterborne vessel comprises: a C-clamp attached to the baseplate such that the C-clamp will secure the baseplate to the side of the waterborne vessel.

6. The apparatus of claim 3 wherein the means for securing the baseplate to the side of the waterborne vessel comprises: a rail clamp attached to the baseplate such that the rail clamp will secure the baseplate to the side of the waterborne vessel.

7. The apparatus of claim 3 wherein the lower portion of the elongate shaft has a lower end, the lower end extending from the lower portion at an angle of about 90 degrees, the marine detection equipment mount being rotatably attached and adjustable to the lower end.

8. The apparatus of claim 7 wherein the upper portion and the lower portion of the elongate shaft are rotatably joined by threaded coupling means; and wherein the apparatus further comprises a resilient washer surrounding the threaded coupling means, whereby the resilient washer allows adjustable tightening of the threaded coupling means.

9. The apparatus of claim 8 wherein the means to secure marine detection equipment to the marine detection equipment mount comprise detachable straps.

10. An apparatus for mounting underwater marine detection equipment on a waterborne vessel comprising:

a baseplate having means to be secured to either side of the waterborne vessel, the baseplate extending outward from the side of the waterborne vessel over the surface of the water;

a shaft holder bracket rotatably mounted to the baseplate, such that the shaft holder bracket may rotate in a plane parallel to the forward and reverse direction of the waterborne vessel from a first position to a second position, the shaft holder bracket having a through passageway to receive a shaft;

an elongate shaft having an upper portion and a lower portion, the upper and lower portions being rotatably joined and separable, the elongate shaft being slidably engaged through the passageway in the shaft holder bracket, such that the elongate shaft can rotate and slide within the shaft holder bracket, the shaft holder bracket having means to secure the elongate shaft from rotation and sliding, the elongate shaft having an end above the shaft holder bracket, the end above the shaft holder bracket having a handle; the elongate shaft being long enough to extend below the bottom surface of the waterborne vessel when the shaft holder bracket is in the first position, the elongate shaft being totally out of the water when the shaft holder bracket is rotated to the second position;

a collar around the elongate shaft adjacent and above the shaft holder bracket, the elongate shaft being able to rotate and slide within the collar, the collar having means to secure the elongate shaft from rotation and sliding;

a first shaft catch mounted to the baseplate aligned below the rotatable shaft holder bracket when the shaft holder bracket is in the first position, the first shaft catch having an opening to receive the elongate shaft and frictionally hold the elongate shaft, such that the elongate shaft may be frictionally held when the shaft holder bracket engaging the elongate shaft is rotated to the first position, and whereby the elongate shaft may be released from the first shaft catch if a force strikes the elongate shaft below the surface of the water;

a second shaft catch mounted to the baseplate on the forward side of the baseplate and aligned with the passageway of the shaft holder bracket when the shaft holder bracket is in the second position, the second shaft catch having an opening to receive the elongate shaft and frictionally hold the elongate shaft when the shaft holder bracket engaging the elongate shaft is rotated to the second position;

a marine detection equipment mount rotatably and adjustably attached to the lower portion of the elongate shaft, such that the marine detection equipment mount can rotate 360 degrees in a plane perpendicular to the surface of the water, the marine detection equipment mount having means to secure marine detection equipment.

11. The apparatus of claim 10 wherein the lower portion of the elongate shaft has a lower end, the lower end extending from the lower portion at a angle of about 90 degrees, the marine detection equipment mount being rotatably attached and adjustable to the lower end.

12. The apparatus of claim 10 wherein the upper portion and the lower portion of the elongate shaft are rotatably joined by threaded coupling means; and wherein the apparatus further comprises a resilient washer surrounding the threaded coupling means, whereby the resilient washer allows adjustable tightening of the threaded coupling means.

13. The apparatus of claim 10 wherein the means to secure marine detection equipment to the marine detection equipment mount comprise detachable straps.

14. The apparatus of claim 10 wherein the means for securing the baseplate to the side of the waterborne vessel comprises: at least one bolt to secure the baseplate to the side of the waterborne vessel.

15. The apparatus of claim 10 wherein the means for securing the baseplate to the side of the waterborne vessel comprise: a C-clamp attached to the baseplate such that the C-clamp will secure the baseplate to the side of the waterborne vessel.

16. The apparatus of claim 10 wherein the means for securing the baseplate to the side of the waterborne vessel comprise: a rail clamp attached to the baseplate such that the rail clamp will secure the baseplate to the side of the waterborne vessel.

* * * * *